US006225435B1

(12) United States Patent
Ito et al.

(10) Patent No.: US 6,225,435 B1
(45) Date of Patent: May 1, 2001

(54) STABLE POLYURETHANEUREA SOLUTIONS

(75) Inventors: Shingo Ito; Toshikazu Matsuda; Masao Umezawa, all of Shiga (JP)

(73) Assignee: DuPont Toray Co. Ltd., Tokyo (JP)

( * ) Notice: Subject to any disclaimer, the term of this patent is extended or adjusted under 35 U.S.C. 154(b) by 0 days.

(21) Appl. No.: 09/380,416

(22) PCT Filed: Mar. 2, 1998

(86) PCT No.: PCT/US98/04253

§ 371 Date: Sep. 1, 1999

§ 102(e) Date: Sep. 1, 1999

(87) PCT Pub. No.: WO98/39373

PCT Pub. Date: Sep. 11, 1998

(30) Foreign Application Priority Data

Mar. 5, 1997 (JP) .................................................... 9-069155

(51) Int. Cl.[7] .......................... C08G 18/32; C08G 18/48; C08G 18/75
(52) U.S. Cl. ............................... 528/76; 528/61; 528/906; 524/873; 524/874
(58) Field of Search ................................ 528/61, 76, 906; 524/873, 874

(56) References Cited

U.S. PATENT DOCUMENTS

| T900,025 | * | 7/1972 | Baker et al. ........................ 568/617 |
| 3,597,398 | | 8/1971 | Davis et al. ............................ 528/64 |
| 4,224,432 | * | 9/1980 | Pechhold et al. ....................... 528/76 |
| 4,772,677 | * | 9/1988 | Kausch et al. ......................... 528/61 |
| 5,288,779 | | 2/1994 | Goodrich ............................. 524/121 |
| 5,616,675 | * | 4/1997 | Wilkinson ............................. 528/61 |
| 5,879,596 | * | 3/1999 | Roach ................................... 264/28 |
| 5,948,875 | * | 9/1999 | Liu et al. .............................. 528/61 |
| 5,981,686 | * | 11/1999 | Waldbauer, Jr. ....................... 528/76 |
| 5,998,574 | * | 12/1999 | Fishback et al. ..................... 528/417 |
| 6,020,451 | * | 2/2000 | Fishback et al. ...................... 528/76 |

FOREIGN PATENT DOCUMENTS

| 0 343 985 A2 | | 11/1989 | (EP) . |
| 343985 | * | 11/1989 | (EP) . |
| 0 579 979 A2 | | 1/1994 | (EP) . |
| 579979 | * | 1/1994 | (EP) . |

OTHER PUBLICATIONS

M.C. Baker et al., US T900,025 I, Jul. 25, 1972, "Defensive Publication".

Product Licensing Index, Research Disclosure, Item 8810, Aug. 1971, p. 47.

* cited by examiner

Primary Examiner—Rabon Sergent
(74) Attorney, Agent, or Firm—George A. Frank

(57) ABSTRACT

A viscosity-stable solution of a polyurethaneurea, in the substantial absence of viscosity stabilizers, and spandex dry-spun therefrom, prepared from certain polyether glycols and aliphatic diisocyanates and ethylene diamine, are provided.

6 Claims, No Drawings

STABLE POLYURETHANEUREA SOLUTIONS

BACKGROUND OF THE INVENTION

1. Field of the Invention

The present invention relates to a viscosity-stable solution of polyurethaneureas and, more specifically, to such solutions without viscosity stabilizer additives.

2. Discussion of Background Art

Polyurethane solutions, generally dry-spun or wet-spun to make spandex, face a common problem of viscosity instability and gelation during storage prior to spinning. Such increases in viscosity can make the solution unusable for spinning into spandex and are, therefore, highly undesirable. U.S. Pat. No. 5,288,779 discloses the need for special additives to stabilize the solutions of polyurethaneureas, including those made from polyethers derived from tetrahydrofuran and 3-methyltetrahydro-furan, bis(4-isocyanatcocyclohexyl)methane, and ethylene diamine.

SUMMARY OF THE INVENTION

The composition of the present invention is a 30–40% by weight solids content viscosity-stable solution of polyurethaneurea in an inert organic solvent and in the substantial absence of a viscosity stabilizer wherein the polyurethaneurea is based on:

- a polymeric glycol selected from the group consisting of poly(tetramethyleneether)glycol and poly(tetramethyleneether-co-3-methyltetramethyleneether) glycol;
- a diisocyanate selected from the group consisting of bis(4-isocyanatocyclohexyl)methane and 5-isocyanato-1-(isocyanatomethyl)-1,3,3-trimethylcyclohexane, present at a capping ratio in the range of about 1.5 to 3.0; and
- ethylenediamine.

The invention also provides a spandex dry-spun from such solution.

DETAILED DESCRIPTION OF PREFERRED EMBODIMENTS

After the formation of a polyurethane (for example a polyurethaneurea) solution in a commercial process, the solution is often held in storage for a long time before being spun into spandex. In addition, any small zones of low-flow in the process equipment can also retain polymer solution for extended periods. During this time, solution viscosity can rise to levels which can cause the production of non-uniform fiber and interfere with spinning continuity. In more severe cases, gel formation can result, which can require frequent cleaning of equipment such as filters and spinnerets. Very little, if any, gel formation or crosslinking can be tolerated during spinning.

It has now been found surprisingly that solutions of the polyurethaneurea compositions of this invention have unexpectedly good solution viscosity stability in the substantial absence of viscosity stabilizing additives. The polyurethaneureas of this invention are prepared from poly(tetramethyleneether)glycol or poly(tetramethyleneether-co-3-methyltetramethylene-ether)glycol and bis(4-isocyanatocyclohexyl)methane or 5-isocyanato-1-(isocyanatomethyl)-1,3,3-trimethyl-cyclohexane (isophorone diisocyanate) and chain-extended with ethylenediamine. The number-average molecular weight of the macromolecular diol utilized is in the range of about 1000 to 5000 and preferably in the range of about 1500 to 3500.

The ratio of diisocyanate to macromolecular glycol (the "capping ratio") is in the range of about 1.5 to 3.0, preferably in the range of about 1.5 to 2.5, and more preferably in the range of about 1.6 to 2.0. The capping ratio when poly(tetramethyleneether-co-3-methyltetramethyleneether) glycol is used is at the upper end of these ranges.

The chain extender used in the present invention is ethylene diamine. Use of other diamines results in polyurethaneurea solutions with unstable viscosities over time. Also, other diamine chain extenders, such as bis(4-aminocyclohexyl)methane, resulted in unsatisfactory polymer solution stability while 1,2-diaminopropane, 1,4-diaminobutane and/or 1,6-diaminohexane resulted in fibers with unacceptably low softening temperatures.

The number-average molecular weight of the polyurethaneurea polymers of the present invention is in the range of about 40,000 to 150,000 while the temperature of the high end of the melting range of the spandex made from the present solutions is in the range of about 200–250° C. in order to provide good thermal stability during processing.

Spandex prepared from the solutions of this invention has high elongation-at-break, good tenacity, low set, low stress decay, and excellent light stability. Elongation generally exceeds 300% and often exceeds 450%. The percent set is generally in the range of about 10–25% while the stress decay is generally in the range of about 15–30%. The $\Delta b$ value (a measure of whiteness retention after environmental exposure) is 10 or less. After exposure to artificial sunshine, the retention of the elongation-at-break of the spandex made from the solutions of the present invention is generally at least 80% and usually at least 90%, and the tenacity retention is generally at least 50% and often at least 65%.

There are no particular restrictions on the denier or the cross-section of the fiber of the present invention.

The polymer solution of the present invention can contain pigments and various types of stabilizers, provided they do not adversely affect the solution stability. For example, hindered phenol-based anti-oxidant reagents such as 2,6-di-t-butyl-4-methylphenol and Sumylzer® GA-80 (Sumitomo Chemical, Tokyo, Japan); benztriazole and hindered amine-based stabilizers such as various types of Tinuvins (Ciba Geigy, Basle, Switzerland); phosphorus-based stabilizers such as Sumilyzer® P-16 (Sumitomo Chemical); inorganic pigments such as titanium oxide, zinc oxide and carbon black; metal soaps such as magnesium stearate; antibacterial agents such as silver, zinc and compounds thereof; odor inhibitors; silicone oil, mineral oil, and other lubricants; and various types of antistatic agents such as barium sulfate, cerium oxide, betaine and phosphoric acid-based compounds can also be included. In order to increase further the durability of the thread, particularly with respect to light stability and resistance to nitrogen oxides, nitrogen oxide trappers such as HN-150 (an aromatic hydrazide manufactured by Nippon Hydrazine, Chiyoda-ku, Tokyo, Japan), thermal oxidation stabilizers such as Sumilyzer GA-80 and light stabilizers such as Sumisorb® 300–622 (Sumitomo Chemical) can be utilized. There are no particular restrictions on the method of addition, and any common method such as static mixing can be used.

The solids content of polyurethaneurea solution of this invention is 30–40% by weight and the solution viscosity is in the range of about 1200–6500 Poise and preferably in the range of about 2000 to 6000 Poise to maintain spinning continuity and consistent spandex properties. These viscosities are generally fairly constant over a 10-day aging period at 40° C.

The following test methods were used:

The isocyanate content of the prepolymers was determined according to the method of S. Siggia, "Quantitative Organic Analysis via Functional Group", 3rd Edition, Wiley & Sons, New York, pages 559–561 (1963).

The strength and elastic properties of the spandex were measured in accordance with the general method of ASTM D 2731-72. Using an Instron Model 4502 tensile tester at 21° C. and 65% relative humidity, three filaments, a 2-inch (5-cm) gauge length and a zero-to 300% elongation cycle were used for each of the measurements. The samples were cycled five times at a constant elongation rate of 50 centimeters per minute. The percent set ("% S") was then calculated as $$\%S=100(Lf-Lo)/Lo,$$

where Lo and Lf are, respectively, the filament (yarn) length when held straight without tension before and after the five elongation/relaxation cycles. Percent elongation at break and tenacity were measured on a sixth extension cycle.

To measure stress decay, the filament was held at 300% extension for 30 seconds on the fifth extension. At the end of 30 seconds, the stress was recorded, and initial and final stress were used to determine stress decay:

$$\text{stress decay } (\%)=(Si-Sf)\times100/Si$$

where

Si=initial stress at 300% extension

Sf=final stress at 300% extension after 30 second hold at 300% extension on the fifth cycle.

Using a Scott Controlled Atmosphere tester (Scott Research Laboratories, Inc.), the degree of yellowing ($\Delta b$ value) of the spandex yarn was measured with a Model D-25-9000 differential calorimeter (Hunter Associates Laboratory, Reston, Va.) after 50 hours of irradiation under an ultraviolet light (carbon arc) in 7 ppm of $NO_2$ gas and at 40° C. and 60% RH. The measurements were made on yarn wound under low tension on an aluminum plate to form a layer of about 0.32 cm thickness.

To test durability to simulated sunlight, spandex samples were irradiated in a Sunshine Weather Meter (Suga Shikenki K.K., Shinjuku-Ku, Tokyo, Japan) for 15 hours at 25% elongation, 63° C., and 60% relative humidity, after which the elongation at break and the strength were measured and compared with the corresponding values before irradiation. The percent retention of the elongation and tenacity were then calculated.

The solution viscosities were measured using a Model DV-8 Falling Ball Viscometer (Duratech Corp., Waynesboro, Va.), operated at 40° C. (ASTM D1343-69). The upper limit of the viscosity that can be measured with the falling ball viscometer is about 8000 Poise.

The number-average molecular weight of the polyurethane was measured by Gel Permeation Chromatography using a polystyrene reference.

The temperature of the high end of the melting range of the spandex was measured by differential scanning calorimetry on the second temperature cycle, using fibers cut to less than 5 mm length. Similar results were obtained from films cast from the polymer solutions with a 12 μm applicator and then dried.

EXAMPLE 1

Poly(tetramethylene ether)glycol, molecular weight of 2000, and bis(4-isocyanato-cyclohexyl)methane were allowed to react at 90° C. at a capping ratio of 1.8 to produce an isocyanate-terminated prepolymer; the percent of isocyanate ("%NCO") in the prepolymer was 2.82 at the end of the reaction. 551.5 g of this prepolymer were collected in a 2-liter separatory funnel and dissolved in 1090 g of DMAc. A solution of a mixture of 10.53 g of ethylene diamine and 0.88 g of diethylamine in 102.7 g of DMAc was added dropwise with stirring over 20 min. 10.17 g of Methacrol® 2462B [a polymer of bis(4-isocyanato-cyclohexyl)methane and N-t-butyldiethanolamine, registered trademark of E. I. du Pont de Nemours and Company, Wilmington, Del.] and 3.89 g of Sumilyzer® GA-80 were then added. The viscosity of the polymer solution, 32% solids content, was determined to be 2400 Poise. Monofilament spandex (18 denier, 20 decitex) spun from this solution at 530 meters per minute had the properties shown in Table I. A sample of the solution, aged without stirring for five days at 40° C., had a viscosity of 2700 Poise, and after ten days at 40° C., of 3100 Poise.

EXAMPLE 2

Poly(tetramethylene ether)glycol, molecular weight of 2000, was reacted at 90° C. with a mixture of 90 mole % bis(4-isocyanatocyclohexyl)methane and 10 mole % isophorone diisocyanate at a capping ratio of 1.8 to obtain an isocyanate-terminated prepolymer (%NCO=2.78). 547.2 g of this prepolymer was collected in a 2-liter separatory funnel and dissolved in 1082 g of DMAc. A solution of 10.47 g of ethylene diamine and 0.88 g of diethylamine in 102.2 g of DMAc was added dropwise with stirring over 20 min. 10.09 g of Methacrol® 2462B and 3.86 g of Sumilyzer® GA-80 were added. The viscosity of the polymer solution was determined to be 4400 Poise at 40° C. Upon aging without stirring, the percent rise in viscosity of this solution was the same as for Example 1. The polymer solution had 32% solids content. It was dry spun at a rate of 530 meters per minute to give a 20 decitex (18-denier) monofilament spandex whose properties are shown in Table I.

EXAMPLE 3

Poly(tetramethyleneether-co-3-methyltetramethyleneether)glycol, number-average molecular weight of 2000, a copolymer prepared from 85 mole % tetrahydrofuran and 15 mole % 3-methyltetrahydrofuran, was reacted at 90° C. with bis(4-isocyanatocyclohexyl) methane at a capping ratio of 2.0 to obtain an isocyanate-terminated prepolymer (3.35%NCO). 550.6 g of this prepolymer were dissolved in 874.3 g of DMAc. A mixture of 13.40 g of ethylene diamine and 1.08 g of diethylamine dissolved in 130.3 g of DMAc was then added dropwise with stirring over 20 min. 10.22 g of Methacrol® 2462B and 3.91 g of Sumilyzer® GA-80 were then added. The polymer solution had 36% solids content, and the viscosity was 2821 Poise at 40° C. An 18-denier (20 decitex) monofilament spandex was dry-spun from this solution at 530 meters per minute. It had the properties reported in Table I. A sample of the solution, aged without stirring for ten days at 40° C., had a viscosity of 3490 Poise.

COMPARISON EXAMPLE 1

Poly(tetramethylene ether)glycol, molecular weight of 1800, and 4,4'-diphenylmethane diisocyanate (outside of this invention) were allowed to react at 90° C. without solvent at a capping ratio of 1.58 to obtain an isocyanate-terminated prepolymer. The percent of isocyanate in the prepolymer was 2.22. The prepolymer was cooled to room temperature. 500 g of the prepolymer were collected in a 2-liter separatory funnel and dissolved in 1000 g of DMAc. A mixture of 7.80 g of ethylenediamine and 1.17 g of diethylamine in 80.7 g of DMAc was then added with stirring. 17.11 g of Methacrol® 2462B and 6.88 g of Methacrol®2390D (a condensation polymer of p-cresol and divinyl benzene, E. I. du Pont de Nemours and Company) were then added. This polymer solution had 32% solids content and a viscosity of 2800 Poise at 40° C. A 2-filament, 22 decitex (20-denier) spandex was dry-spun from this solution at 733 meters per minute. Table I shows properties of this spandex. A sample of the solution, aged without stirring for five days at 40° C., had a viscosity of 7500 Poise. After ten days at 40° C., the viscosity was too high to measure.

COMPARISON EXAMPLE 2

Poly(tetramethyleneether-co-3-methyltetramethyleneether)glycol, number-average molecular weight of 3730, a copolymer prepared from 85 mole % tetrahydrofuran and 15 mole % 3-methyltetrahydrofuran, was reacted with 4,4'-diphenylmethane diisocyanate for 2 hours at a capping ratio of 1.9 without solvent at 90° C. to obtain an isocyanate-terminated prepolymer. The percent unreacted isocyanate at the end of the reaction was 1.80. The prepolymer was cooled to room temperature, and 500 g were dissolved in 1014 g of DMAc. A chain-elongation reaction was then carried out by adding a solution of 6.11 g ethylenediamine and 0.93 g diethylamine in 63.4 g DMAc with stirring. 17.05 g of Methacrol® 2462B and 6.88 g of Methacrol®2390 D were then added. The polymer solution had a solids content of 32 wt %, and its viscosity was 2400 Poise at 40° C. The solution was dry-spun at 733 meters per minute to form a 2-filament 22 decitex (20-denier) spandex. Selected properties are shown in Table I. Upon aging the polymer solution without stirring at 40° C., the rise in the solution viscosity was comparable to that in Comparison Example 1, clearly unacceptable.

COMPARISON EXAMPLE 3

A polyurethaneurea was prepared substantially according to Example 1, but bis(4-aminocyclohexyl)methane was substituted for ethylene diamine as the chain extender. The initial viscosity of the polymer solution was 2600 Poise. After aging for 2 days at 40° C., the viscosity had risen to 8000 Poise, and after 3 days, the viscosity was too high to measure.

In Table I, %E is elongation-at-break, T is tenacity, SD is stress decay, %E retained and T retained are the elongation-at-break and tenacity, respectively, retained after exposure to the Sunshine Weather Meter, and Δb is the degree of yellowing after exposure to the Scott Controlled Atmosphere tester. These data show that the spandex prepared from the viscosity-stable solutions of this invention retain all of the desirable properties of spandex prepared from the polyurethanes of the prior art.

TABLE I

|  | Ex.1 | Ex.2 | Ex.3 | Comp. Ex.1 | Comp. Ex.2 |
|---|---|---|---|---|---|
| High-side melting point | 225° C. | 225° C. | 225° C. | 270° C. | 270° C. |
| % E | 573% | 583% | 660% | 534% | 587% |
| T, dN/tex | 1.02 | 0.94 | 0.62 | 0.99 | 0.71 |
| SET, % | 23 | 22 | 24 | 22 | 10 |
| SD, % | 23% | 23% | 23% | 27% | 16% |
| % E retained | 97% | 92% | 93% | 83% | 80% |
| T retained | 75% | 69% | 61% | 32% | 34% |
| Δb | 3.1 | 3.5 | 4.0 | 22.9 | 18.7 |

What is claimed is:

1. A viscosity-stable solution, at 30–40% by weight of solids content, of polyurethaneurea in an inert organic solvent and in the substantial absence of a viscosity stabilizer, wherein the polyurethaneurea consists essentially of the reaction product of:

a polymeric glycol selected from the group consisting of poly(tetramethyleneether)glycol and poly(tetramethyleneether-co-3-methyltetramethyleneether)glycol;

a diisocyanate selected from the group consisting of bis(4-isocyanatocyclohexyl)methane and 5-isocyanato-1-(isocyanatomethyl)-1,3,3-trimethylcyclohexane, present at a capping ratio in the range of about 1.5 to 3.0; and ethylenediamine.

2. The solution of claim 1 wherein the diisocyanate is bis(4-isocyanatocyclohexyl)methane and the capping ratio is in the range of about 1.5 to 2.5.

3. The solution of claim 2 wherein the glycol is poly(tetramethyleneether)glycol.

4. The solution of claim 2 wherein the glycol is poly(tetramethyleneether-co-3-methyltetramethyleneether)glycol.

5. The solution of claim 1 wherein the glycol has a number average molecular weight of 1000–5000.

6. A spandex dry-spun from a viscosity-stable solution of polyurethaneurea in an inert organic solvent and in the substantial absence of a viscosity stabilizer, wherein the polyurethaneurea is consist essentially of the reaction product of:

a polymeric glycol selected from the group consisting of poly(tetramethyleneether)glycol and poly(tetramethyleneether-co-3-methyltetramethyleneether)glycol;

a diisocyanate selected from the group consisting of bis(4-isocyanatocyclohexyl)methane and 5-isocyanato-1-(isocyanatomethyl)-1,3,3-trimethylcyclohexane, present at a capping ratio in the range of about 1.5 to 3.0; and ethylenediamine.

* * * * *

UNITED STATES PATENT AND TRADEMARK OFFICE
CERTIFICATE OF CORRECTION

PATENT NO. : 6,225,435 B1
DATED : May 1, 2001
INVENTOR(S) : Ito Shingo et al.

It is certified that error appears in the above-identified patent and that said Letters Patent is hereby corrected as shown below:

Title page,
Item [75], Inventor name is incorrect as stated "Shingo Ito". The correct reading should be -- Ito Shingo --.

Signed and Sealed this

Eleventh Day of December, 2001

Attest:

*Nicholas P. Godici*

NICHOLAS P. GODICI
*Attesting Officer*  *Acting Director of the United States Patent and Trademark Office*